US008533754B2

(12) United States Patent
Cho

(10) Patent No.: US 8,533,754 B2
(45) Date of Patent: Sep. 10, 2013

(54) EMBEDDED VIDEO PLAYER WITH MODULAR AD PROCESSING

(75) Inventor: Paul Cho, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/341,739

(22) Filed: Dec. 30, 2011

(65) Prior Publication Data

US 2012/0311627 A1   Dec. 6, 2012

Related U.S. Application Data

(63) Continuation of application No. PCT/US2011/039172, filed on Jun. 3, 2011.

(30) Foreign Application Priority Data

Jun. 3, 2011   (AU) ................................. 2011205061

(51) Int. Cl.
*H04N 7/10*   (2006.01)
*H04N 7/025*   (2006.01)

(52) U.S. Cl.
USPC .................. 725/34; 725/35; 725/38; 725/86; 725/110; 725/131; 725/139; 725/151; 709/202; 709/203; 715/202; 715/204; 715/719; 715/728; 715/730

(58) Field of Classification Search
None
See application file for complete search history.

(56) References Cited

U.S. PATENT DOCUMENTS

| 6,122,011 | A  | * | 9/2000  | Dias et al. ...................... 348/569 |
| 6,177,931 | B1 | * | 1/2001  | Alexander et al. ............... 725/52 |
| 6,760,916 | B2 |   | 7/2004  | Holtz et al. |
| 8,108,257 | B2 |   | 1/2012  | Sengamedu |
| 8,266,246 | B1 | * | 9/2012  | Cho et al. ....................... 709/217 |
| 2008/0109844 | A1 |   | 5/2008  | Baldeschwieler et al. |
| 2008/0288973 | A1 | * | 11/2008 | Carson et al. ................... 725/32 |
| 2008/0288976 | A1 | * | 11/2008 | Carson et al. ................... 725/34 |
| 2008/0307454 | A1 |   | 12/2008 | Ahanger et al. |
| 2008/0320512 | A1 | * | 12/2008 | Knight ............................ 725/32 |
| 2009/0024927 | A1 | * | 1/2009  | Schrock et al. ................ 715/722 |
| 2009/0037263 | A1 |   | 2/2009  | Patil |
| 2009/0089830 | A1 | * | 4/2009  | Chandratillake et al. ........ 725/32 |
| 2009/0119169 | A1 | * | 5/2009  | Chandratillake et al. ........ 705/14 |
| 2009/0282433 | A1 | * | 11/2009 | Petta ................................ 725/32 |
| 2010/0235468 | A1 | * | 9/2010  | Cobb et al. ..................... 709/218 |
| 2010/0251290 | A1 | * | 9/2010  | Kodialam et al. ............... 725/34 |
| 2010/0281042 | A1 | * | 11/2010 | Windes et al. ................. 707/756 |

OTHER PUBLICATIONS

Australian First Examination Report dated Jan. 20, 2012 for Priority Australian Patent App. No. 2011205061, filed Jan. 3, 2011, 2 pages.

* cited by examiner

*Primary Examiner* — Jason J Chung
(74) *Attorney, Agent, or Firm* — Kilpatrick Townsend & Stockton LLP

(57) ABSTRACT

A method, device and/or system for operating or causing a video player embedded into a web page to play a video is disclosed. Embed code is placed into the web page. When the web page is loaded into a web browser, player code is loaded and optionally customized to display one or more videos that can be selected for playback with the player code. When an end user selects the video using the player code, any ad and/or analytics module associated with the video are retrieved. The functionality of the ad and/or analytics module is integrated into the player code to allow tracking of analytics and inserting advertising into the video.

10 Claims, 9 Drawing Sheets

EMBEDDED VIDEO PLAYER WITH MODULAR AD PROCESSING

This application is related by priority to: PCT/US11/039172 filed Jun. 3, 2011, entitled "EMBEDDED VIDEO PLAYER WITH MODULAR AD PROCESSING;" and Australian Patent Application No. 2011205061 filed Jun. 3, 2011, entitled "EMBEDDED VIDEO PLAYER WITH MODULAR AD PROCESSING;" both of which are hereby incorporated by reference in their entirety for all purposes.

BACKGROUND

This disclosure relates in general to video players and, but not by way of limitation, to video players loaded from within a browser.

Embedded video players are placed into web pages to allow playback of video without leaving the browser environment. Scripting and run-time languages such as Flash™ and HTML5 are used to seamlessly integrate video playback into browsers. The embedded video players are adding functionality all the time. Additional functionality means additional lines of code that need to downloaded each time a web page is rendered.

Video players can play a video with ads inserted therein. Single-link players encode the ads into the video file such that there is little flexibility in changing what ads will roll later. Playlist video players retrieve video files and sequentially play them so as to give the viewer a seamless playback experience. There are many different ad types and different ad servers that supply those ads. Coding an embedded video player to support all the different possibilities requires additional lines of code.

SUMMARY

In one embodiment, the present disclosure provides a method, device and/or system for operating or causing a video player embedded into a web page to play a video. Embed code is placed into the web page. When the web page is loaded into a web browser, player code is loaded and optionally customized to display one or more videos that can be selected for playback with the player code. When an end user selects the video using the player code, any ad and/or analytics module associated with the video are retrieved. The functionality of the ad and/or analytics module is integrated into the player code to allow tracking of analytics and inserting advertizing into the video.

In another embodiment method and system for interacting with a video player embedded into a web page to cause playing of a video. Embed code is provided that runs within a web browser. An identifier is received from the embed code after the web browser loads the embed code. Code for implementing video player functionality is sent after the web browser loads the embed code. Parameters corresponding to the identifier to the web browser are sent, wherein the parameters identify the video that can be rendered by the video player. A request for ad module code that integrates with the code to provide ad request functionality to the video player is received. The request is received after an end user requests playback of the video from the video player functionality. The ad module code is sent to the web browser.

In another embodiment, a method and system for operating a video player embedded into a web page to play a video is disclosed. Embed code is loaded that runs within a web browser. An identifier is sent from the embed code after the web browser loads the embed code. Code for implementing video player functionality is received after the web browser loads the embed code. Parameters corresponding to the identifier with the web browser are received, wherein the parameters identify the video that can be rendered by the video player. A request for ad module code that integrates with the code to provide ad request functionality to the video player is sent. The request is received after an end user requests playback of the video from the video player functionality. The ad module code is received at the web browser.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
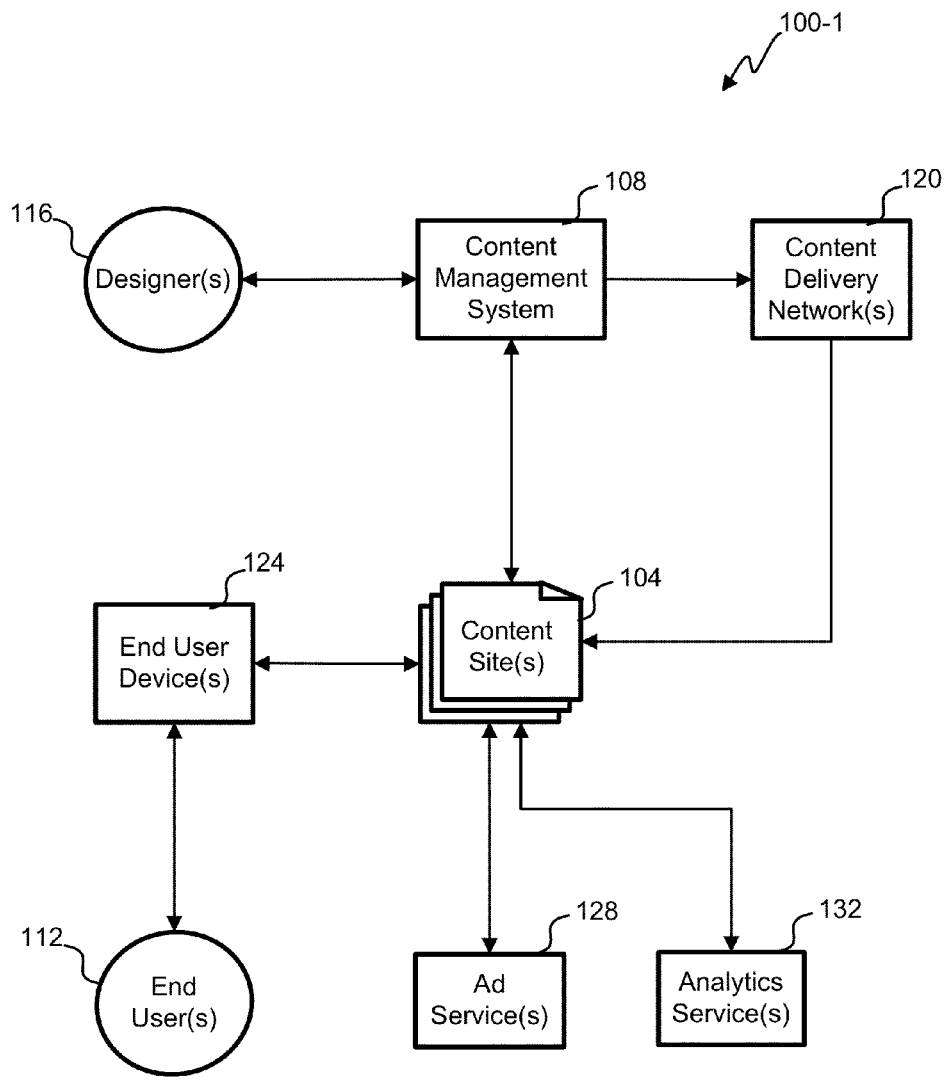
FIG. 1 depicts a block diagram of an embodiment of a content distribution system.

Referring first to FIG. 1, a block diagram of an embodiment of a content distribution system 100 is shown. Designers 116 interact with a content management system (CMS) 108 to syndicate content for end users 112 to enjoy on their end user devices 124. Content sites 104 include web sites that are accessed by the end user devices 124 using a web browser, content player or other application software. A content object is any content file or content stream and could include, for example, slideshow, animation, video, and/or audio. The content object could be live, delayed or stored. Throughout the specification, references may be made to a content object, content, content stream and/or content file, but it is to be understood that those terms could be used interchangeably wherever they may appear.

The content sites 104 could be set up by the designer 116 or by end users 112. When the designer 116 originally syndicates content, a content site 104 is typically chosen for embedding code that plays the content object, but there is an option to take embed code from that first content site 104 for placement in another content site 104 by an end user 112. The embed code renders itself or cause the content object to be rendered on any number of end user devices 124 with video player code that is referenced in the embed code. The video player code partially loads when the end user 112 request that web page on the content site 104. After selection of a content object, additional modules associated with the content object are loaded. In one embodiment, this avoids downloading unnecessary code. End user devices 124 could be a phone, a smart phone, a tablet, an electronic pad, a personal computer, an IPTV player, a portable music player, a set top box, etc.

This embodiment optionally uses a content delivery network (CDN) 120 to deliver content objects, embed code, video player code, module code, web pages, etc. as an alternative or supplement to the CMS 108 can hosting. Designers 116 can syndicate storing their content anywhere, but would often use a CDN 120 for popular content. In some cases, some content is served from the CDN 120, other content is hosted on the content site 104 and still other content is hosted on the CMS 108. As embed code is moved from site to site, hosting of content and code can remain the same or move in whole or in part. The original designer 116 originally syndicating the embed code has less control of how the embed code moves around to various content sites 104.

Other embodiments control how the embed code disseminates across the Internet. The number of times embed code can be propagated in succession can be limited. For example, the designer 116 might only allow their original page be embedded in another content site 104, but prevent embed code being accessible to end users 112 from that second content site 104. Additionally, security could be embedded in the HTML and/or JavaScript™ of the embed code that authenticates the embed code to check for unauthorized modification. A checksum or hash could be calculated in the embed code and passed back to the CMS 108 for authentication, for example.

The embed code loads video player code that has the ability to playback the content object within the web browser running on the end user device 124 of the end user 112. The video player code with any additional modules loaded interfaces with other services to aid in serving ads and providing analytics. One or more ad services 128 are supported to allow the ad modules of the video player to provide contextual information used by the ad service 128 in providing an ad. One or more analytics services 132 interface with analytics modules of the video player to record usage information related to the rendering of the content object for the end user 112. Other embodiments can use ad serving functionality supported by the CMS 108 or CDN 120 as an alternative or in addition to the ad service(s) 128 and analytic service(s) 132.

Figure 2:
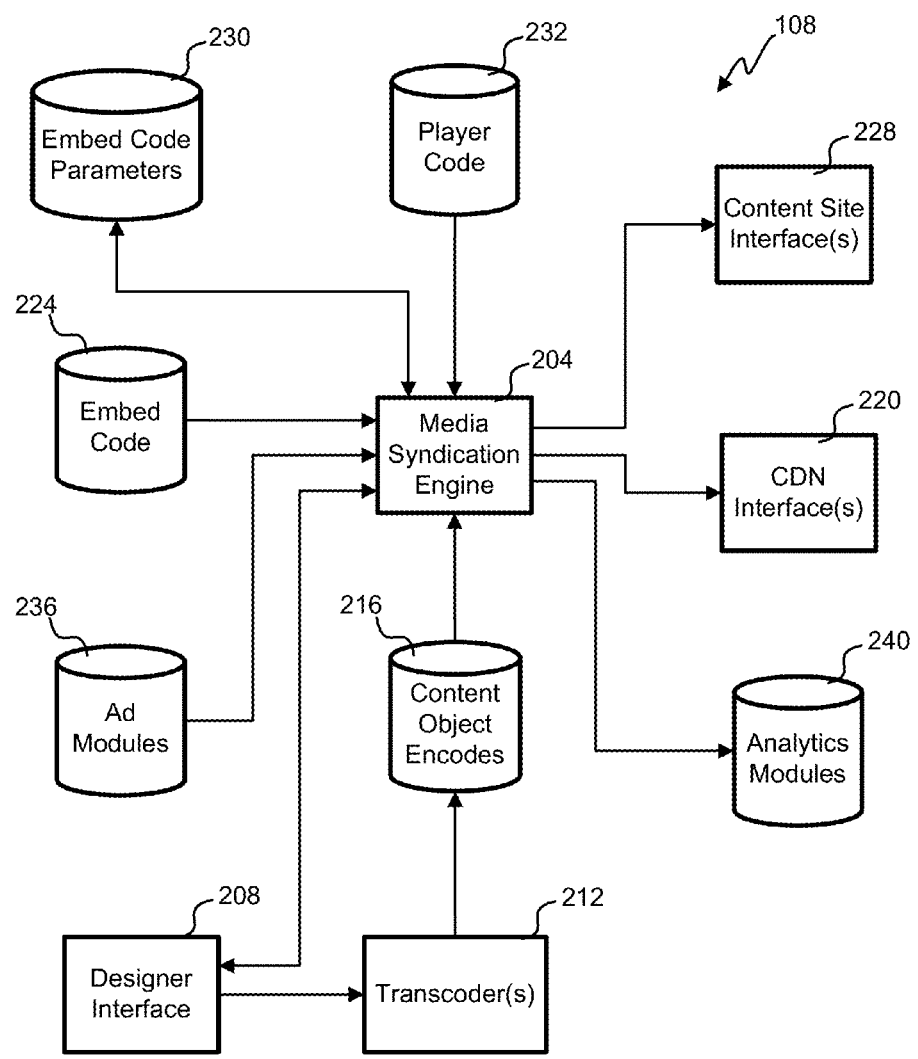
FIG. 2 depicts a block diagram of an embodiment of a content management system.

With reference to FIG. 2, a block diagram of an embodiment of the CMS 108 is shown. To syndicate content, the designer 116 interacts with a designer interface 208. The content object is operated upon by a transcoder(s) 212 to be processed into one or more codings, formats, bitrates, protocols, etc. to support all the various end user devices 124 that might render the content object. In this embodiment, the content object is transcoded into eight different encodes or other representations, but other embodiments could have more or less encodes at the selection of the designer 116. The transcoded versions are stored as content object encodes 216.

The designer 116 further interacts with the designer interface 208 to edit the content objects, insert advertizing capability, specify the analytics to measure, specify where the content object should be syndicated, how the content playback applet embeds in a web page, where the content objects are hosted, etc. The designer 116 can edit the content object prior to transcoding. Advertizing can have their location specified for insertion or can be manually spliced into the content object or later during playback in the web browser on the end user device 124. There are several versions of the Flash,™ HTML5 with JavaScript™ or Silverlight™ player that are stored as player code 232. The video players built into browsers and phones are also supported. The designer can define the look and functionality for the player from pre-defined and/or customized templates that are stored as embed code parameters 230.

Embed code parameters 230 are customized by the designer to affect how the embed code will customize the video player code to operate on a particular end user device 124. The embed code 224 may check to see if certain fallback content objects are enabled in the embed code parameters 230 to effectively customize operation of the embed code 224 for different domains, clients, zones, sub-directories, content types, end user devices, etc. For example, the designer may not want to pay for mobile format encodings, or they may have disabled them because they don't want users to get access to content that cannot be protected by digital rights management (DRM). The embed code 224 refers back to the embed code parameters upon execution to customize how the embed code 224 operates. This allows modification of the operation of the embed code 224 after placement on a web site without having to update or change the embed code.

Security for the embed code 224 can be configured by changing the embed code parameters 230 at any time including after the embed code is placed into a web page. The embed code 224 has programming to allow operation at varying levels of security. The security may be managed on the end user device 124, by the content management system 108 or a combination thereof as dictated by the embed code parameters 230. The embed code 224 could query to the embed code parameters 230 to determine what security features to perform on the end user device 124 and which are performed by the content management system 108. In some cases, the embed code 224 and/or the content management system 108 will prevent certain actions from being performed. For example, the end user device 124 could be a model of phone, have out of date DRM, have invalid security certificates, have malfunctioning or obsolete hardware that would cause certain content objects to be unplayable as choreographed by the embed code 224 and any embed code parameters 230.

Embed code 224 is JavaScript™ or another scripting language that executes in a web browser or player on the end user device 124. The embed code 224 is placed in a web page of the content site 104 by the designer themselves or automatically using the media syndication engine 204. The embed code autonomously determines the best way to play a content object in a web browser or player application. Different end user devices 124 dictate the need for embed code that can react accordingly to provide consistent playback regardless of the platform. Other embodiments could have server-side logic to determine the best way to play the content object. The server-side logic can support a wider variety of end user devices 124, for example, to support devices without JavaScript™ and/or Flash.™

At the option of the designer, the media syndication engine 204 can automatically syndicate the content. The media syndication engine 204 controls a content site interface 228 and a CDN interface 220. The content site interface 228 can automatically insert the embed code and/or content object, for example, onto social networking sites, blog sites, video sharing sites, etc. The CDN interface 220 is used to place content objects onto one or more CDNs 120 that might host and/or cache the content objects. The CDN interface 220 can supply content objects through pre-population of the CDN 120 or when the CDN 120 experiences a cache miss.

Editing and ad insertion are also performed by the media syndication engine 204. The designer can edit videos and metadata (e.g., title, description, tags) and stitch, cut and otherwise edit video, sound and images. Ad insertion can be done by splicing or overlaying ads directly into the content before delivery or controlled by player logic at run-time to switch-out or overlay the content with an in-place ad, postplate or banners at the end user device 124.

The CMS 108 provides modules on demand to the player code 232 once loaded after rendering of a web page in a browser. The player code 232 has certain functionality to render the content and provide a base-level functionality. On a content object-by-content object basis, additional modules 236, 240 can be loaded. Each content object can specify the modules used to enhance the functionality of the player code 232. For example, a number of analytics modules 240 support any number of different analytics function and analytics services 132.

Ad modules 236 are developed to support any number of ad types and any number of ad services 128. Ad services 128 can be hosted within the CDN 220 or CMS 108 in some embodiments, but would also include third-party ad services 128. The ad services 128 each have different interfaces that require different information in a different sequence. There are ad modules 236 to support the different ad services 128. There can be different ad modules 236 to support different offerings of a particular ad service 128. For example, DoubleClick™ is a third-party ad service 128. There is a particular protocol for interfacing with DoubleClick™ (i.e., DART) and an ad module 236 is designed to support that particular interface and protocol.

Figure 3:
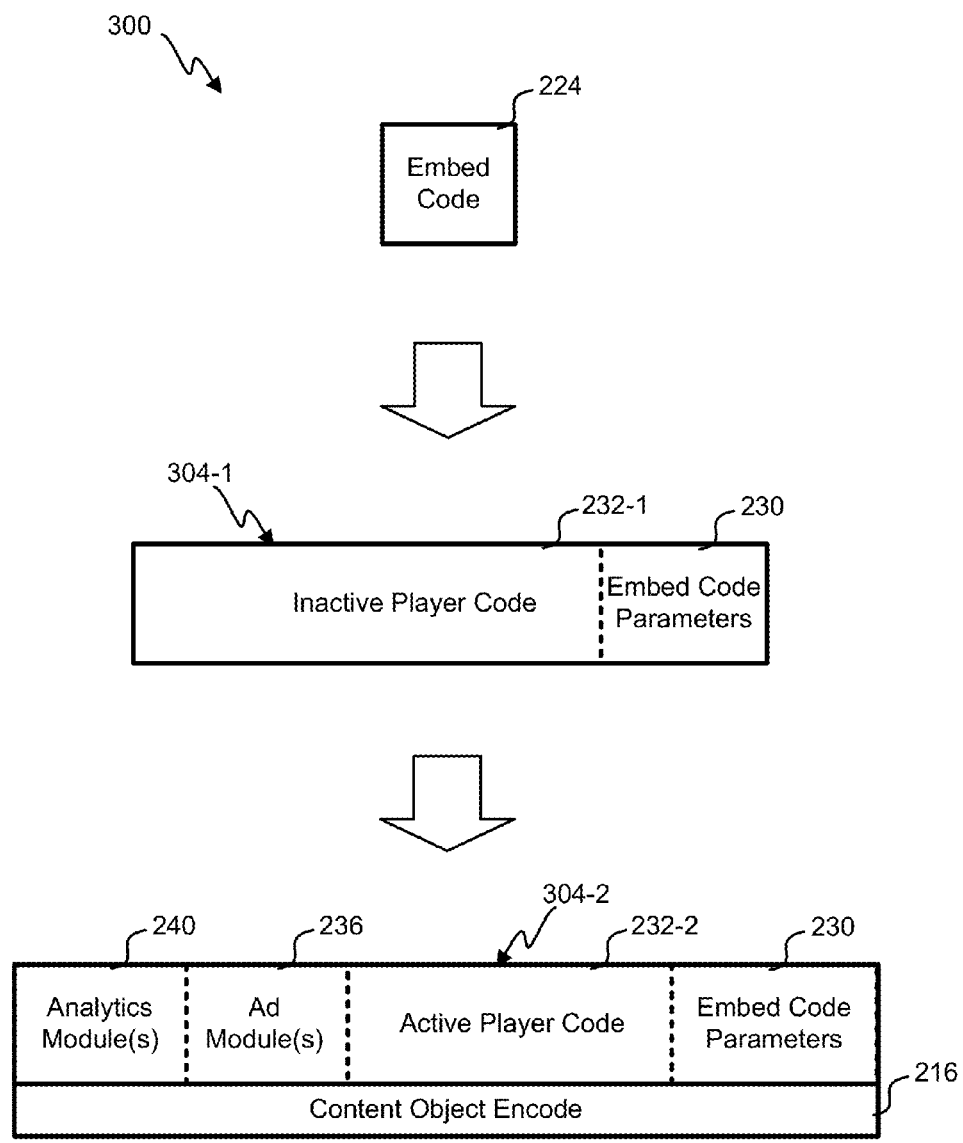
FIG. 3 depicts a diagram of an embodiment of a code flow for an embedded function in a web page.

Referring next to FIG. 3, a diagram of an embodiment of a code flow 300 for an embedded function in a web page is shown. The code for playback evolves as a function of when the web page is loaded and how the end user interacts with the content. In a first phase, the embed code 224 is just a few lines that reference the video player code 232 along with a channel, media and/or playlist identifier. The identifier(s) is used by the CMS 108 to determine the embed code parameters for a particular rendering of the video player. The video player 304-1 renders in a second phase with customization of the interface (e.g., colors, configuration of the various content tiles, information about the content objects, player interface skins, particular content objects and their arrangement, etc.) according to the embed code parameters 230.

In a third phase, the end user 112 has selected one of the tiles for a particular content object from what is typically many tiles corresponding the many content objects. The embed code parameters 230 include identification of the content objects and the additional metadata the goes along with each content object. This metadata includes identification of the analytics modules 240 and ad modules 236 used for each content object. The modules 236, 240 are requested from the CMS 108 to add that functionality to the video player 304-2 in the third phase.

The size of the code in the web browser increases in each phase. The embed code is just a few lines. The video player code in the second phase is tens of thousands of lines of code. Loading of each module may add one or two thousand lines of code. By loading modules only as needed after rendering of the web page, the bandwidth requirements are reduced in one embodiment.

Figure 4:
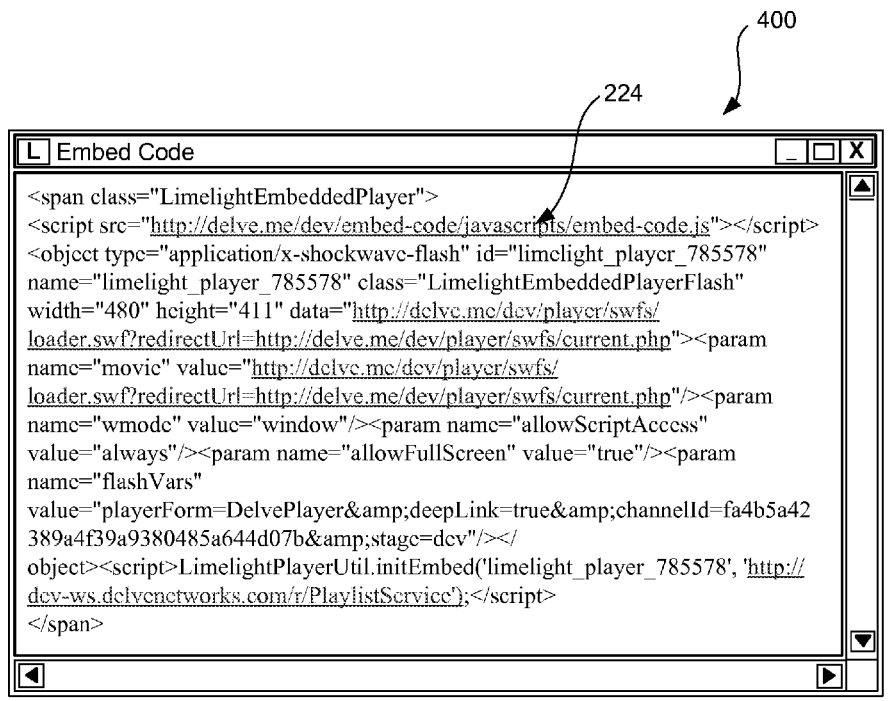
FIG. 4 depicts a screen shot of an embodiment of embed code that is added to a web page to provide content player functionality.

With reference to FIG. 4, a screen shot 400 of an embodiment of embed code 224 that is added to a web page to provide content player functionality is shown. The embed code could be implemented in as few as five lines of code that help identify the type of end user device 124 and load the appropriate player code 232 for that environment. The embed code 224 may or may not include links to the content object(s). In any event, the embed code 224 includes an identifier to know what embed code parameters 230 to load to customize the end user interface.

Figure 5:
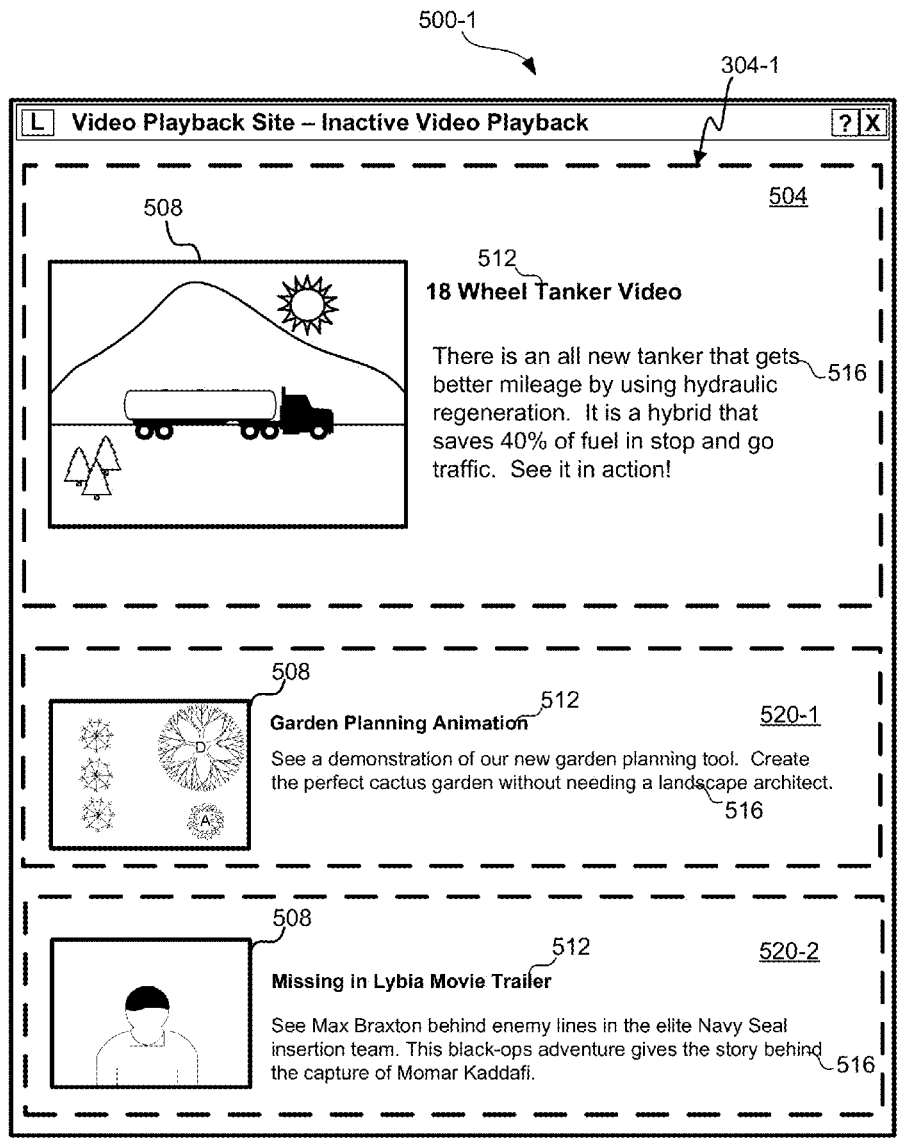
FIG. 5 depicts a screen shot of an embodiment of showing an end user interface to the video player in its inactive state after rendering of a web page host.

Referring next to FIG. 5, a screen shot of an embodiment of showing an end user interface 500-1 to the video player 304-1 in its inactive state after rendering of a web page host is shown. There are three content objects referenced in this embodiment. A primary tile 504 provides an emphasized presentation of a particular content object, but two secondary tiles 520 are also available for selection. Each tile 504, 520 will activate a different content object for playback. Also, each content object can trigger a different playback experience that use different modules 236, 240. The metadata for each content object held in the embed code parameters 230 specifies all the customization onto the base video player functionality. In each tile 504, 520, there is a still picture or video 508, a title 512 and a description 516.

Figure 6A:
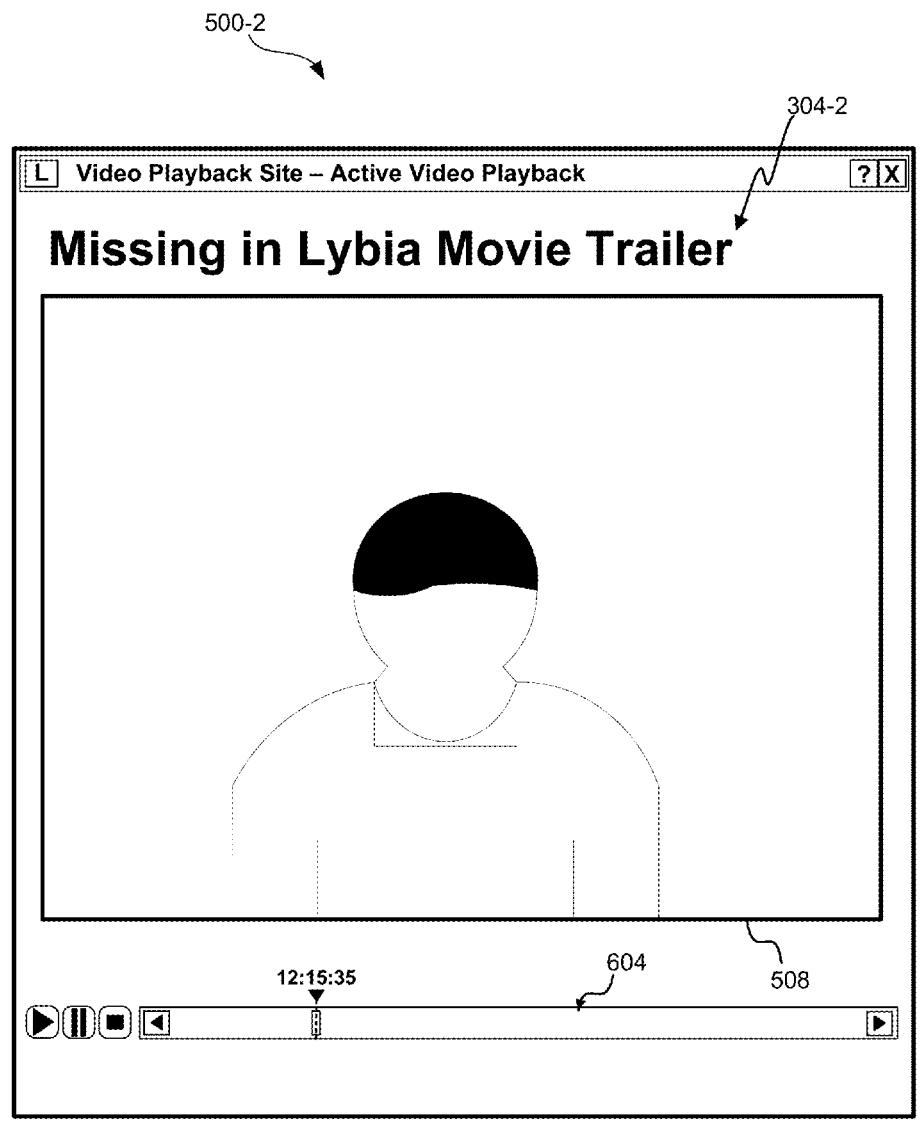
FIGS. 6A and 6B depict screen shots of embodiments showing an end user interface to the video player in its active state after selection of a particular video by the end user for playback.

With reference to FIG. 6A, a screen shot of an embodiment of showing an end user interface 500-2 to the video player 304-2 in its active state after selection of a particular video by the end user for playback is shown. The lower secondary tile 520-2 was selected by the end user 112 while interacting with the end user interface 100-1 in FIG. 5 to activate the video player 304-2 to focus upon that content object. Player controls 604 are displayed when after selecting a particular content object. The modules 236, 240 associate with the content object are requested from the CMS 108 to add additional functionality to the video player 304-2. In this embodiment, a DoubleClick™ ad service 128 is used to include embedded video advertisement so activating the lower secondary tile 520-2 loads an ad module 236 that is specialized for interaction with the DoubleClick™ ad service 128.

Figure 6B:
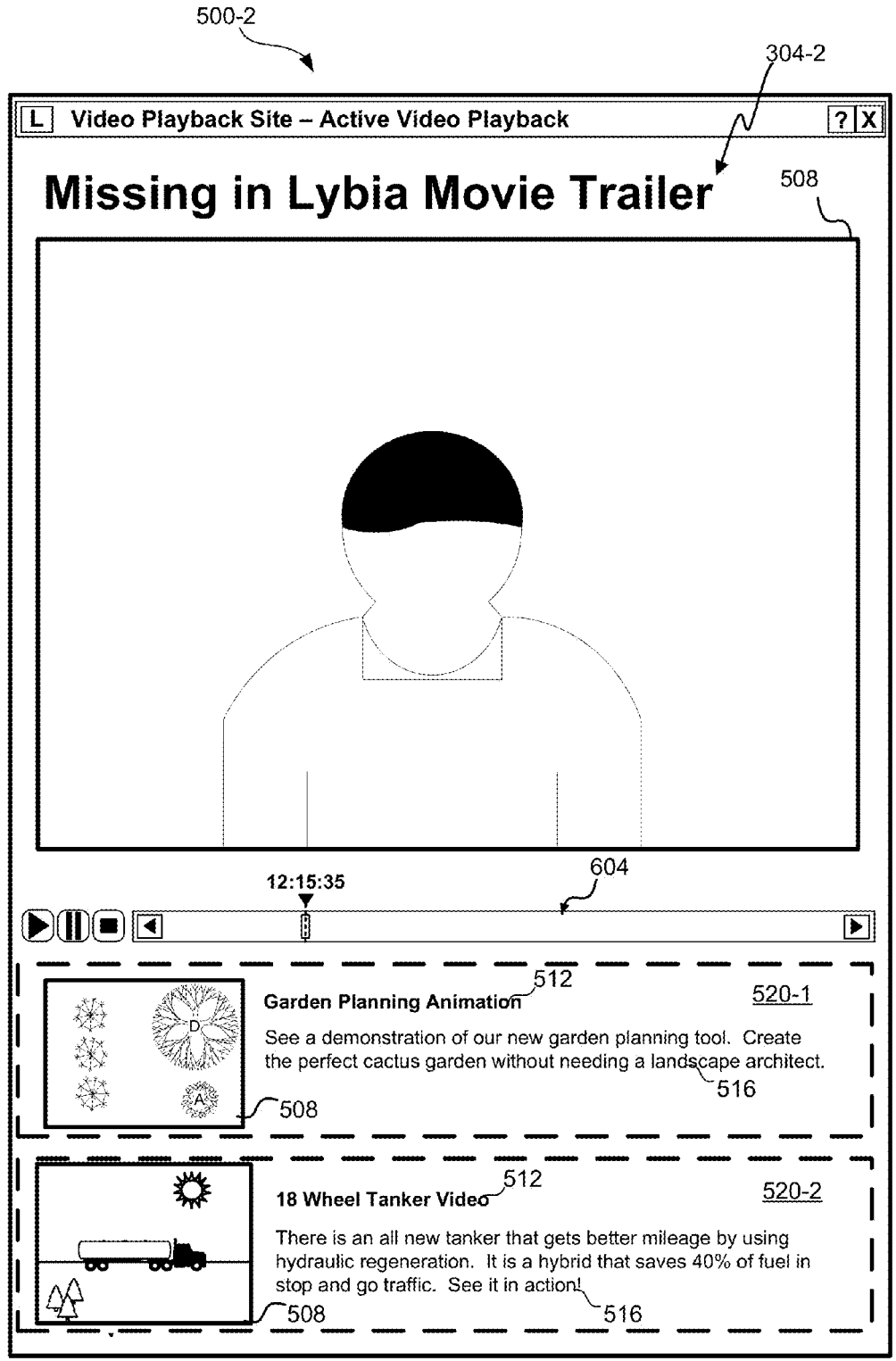

With reference to FIG. 6B, a screen shot of another embodiment of showing an end user interface 500-2 to the video player 304-2 in its active state after selection of a particular video by the end user for playback is shown. This embodiment includes a portion of a playlist in two secondary panes 520. Selection of either of the secondary panes 520 would result in loading the appropriate modules 236, 240 before starting playback of the video at the top of the window.

Although this embodiment only shows a single video being played back, other user interface 500 configurations are possible. There could be secondary tiles 520 available for selection shown to allow the end user 112 to change which content object is being played. The secondary tiles 520 could be arranged on the bottom or side in any quantity. The content objects in the secondary tiles 520 are often suggestions that were automatically chosen. Designers 116 can expressly define the secondary tiles 520 and/or give limitations to what can be allowed as a secondary tile 520. For example, secondary tiles 520 may only point to content with a particular channel identifier for the designer's organization.

Figure 7:
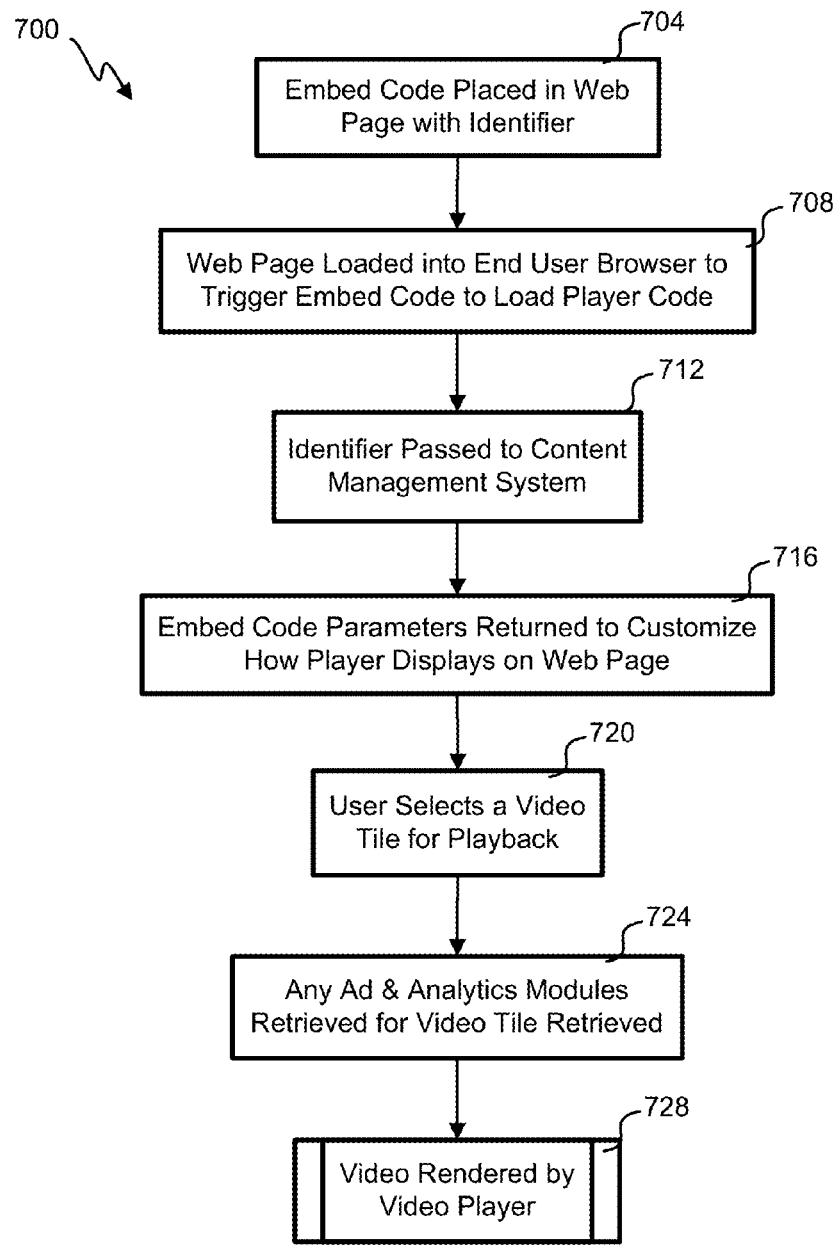
FIG. 7 illustrates a flowchart of an embodiment of a process for configuring a video player embedded in a web page for content playback.

Referring next to FIG. 7, a flowchart of an embodiment of a process 700 for configuring a video player embedded in a web page for content playback is shown. The depicted portion of the process begins in block 704 where the designer 116 directly or using automatic placement by the CMS 108 causes the embed code 224 being placed in a web page. The embed code 224 includes an identifier the references the proper embed code parameters 230 that will customize the end user interface 500.

At some point, the web page with the embed code is loaded into an end user's browser to trigger activation of the embed code 224 in block 708. Activation of the embed code 224 results in calls to the CMS 108 for player code 232 that will provide a base of functionality to the video player. The identifier is passed from the end user device 124 to the CMS 108 in block 712. The CMS 108 retrieves the embed code parameters 230 that define how the player's end user interface 500-1 displays on the web page in an inactive state in block 716.

At some point the end user 112 interacts with the end user interface 500-1 to select a particular content object in one of the tiles 504, 520 in block 720. The modules 236, 240 associated with the selected content object are requested from the CMS 108 in block 724. Those ad modules could do banner ads in the playback tile, could do embedded video ads played after pausing the content object, and/or overlay banner ads that are superimposed over the video. With all the functionality added by the selected modules 236, 240 playback occurs in block 728.

Figure 8:
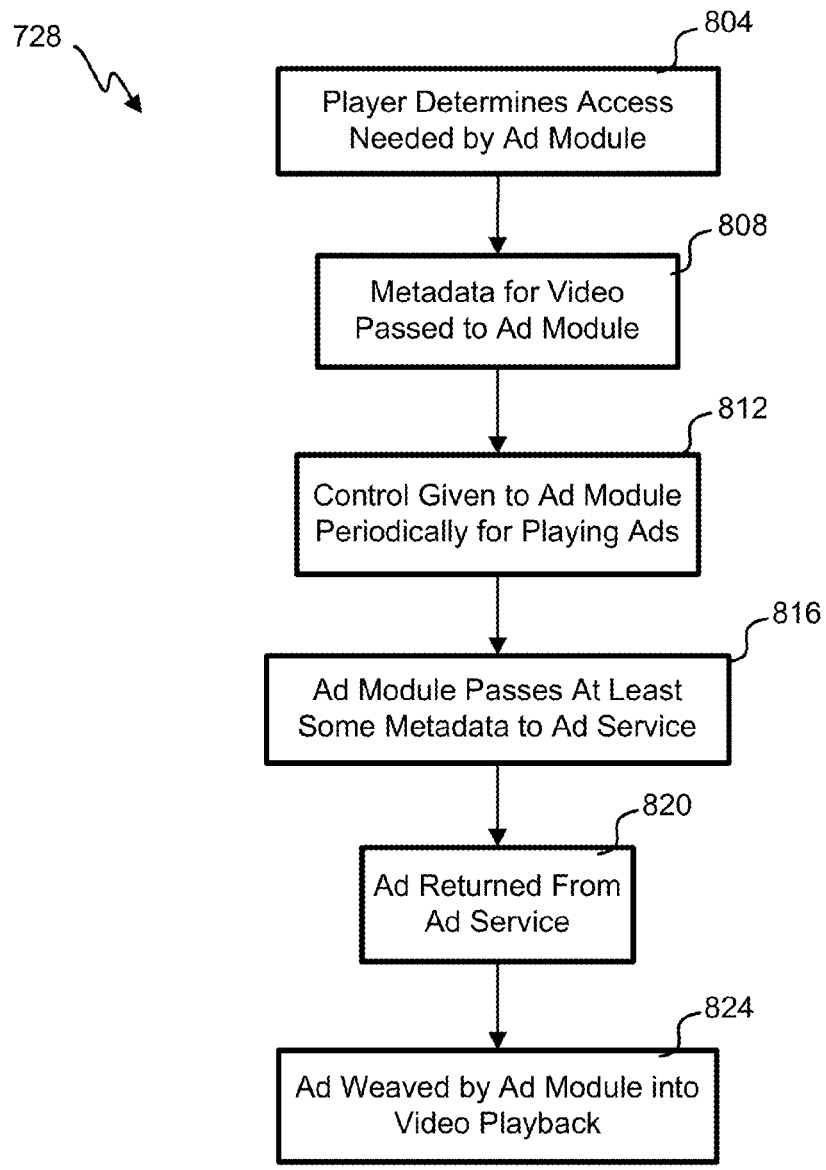
FIG. 8 illustrates a flowchart of an embodiment of a process for rendering video by a video player embedded in a web page.

With reference to FIG. 8, a flowchart of an embodiment of a process 728 for rendering video by a video player embedded in a web page is shown. This process 728 corresponds to the last block in the prior figure. The depicted portion of the process begins in block 804 where the access needed to video player baseline is determined. There are any number of application program interfaces (APIs) to support the various ad modules 236. Generally, there is an ad API and an analytics API. There could be different APIs for different classes of advertising, for example an embedded video ad API and an overlay banner ad API. In this embodiment, there is no analytics module 240 and only an ad module 236.

Various ad services 128 use different metadata on the content object in choosing and tracking an ad. For example, the genre, playback time, placement of the ad, channel, zone, subject matter, aspect ratio, video quality, playback device may be passed to the ad service 128. This metadata was previously retrieved with the embed code parameters 230. The ad modules 236 for the particular ad service 128 knows the information and protocol that would be sent to allow the ad service 128 to find an acceptable ad. The metadata is passed to the ad module 236 in block 808. The metadata may include a superset of information that is not all used by the ad service 128, but a standard ad API may be used to support a number of ad modules 236.

Control of player functions is passed to the ad module in block 812. For example, the control given to an ad module 236 that can place ads into the video stream would include the ability to pause playback, insert and play a video ad and resume playback. In block 816, at least some of the metadata is passed to the ad service 128 as required by its interface and protocol. The ad is returned from the ad service in block 820. The ad module interacts with the baseline video code to weave the ad into the end user experience in block 824.

It is to be understood that there could be multiple types of modules 236, 240 active for a particular content object. The different ad modules work cooperatively to accomplish their specific task in the greater context of playback. In one example, there could be three ad modules 236 for banner, overlay and embedded ads in addition to two analytics modules 240 that will provide information to two different analytics services 132.

A number of variations and modifications of the disclosed embodiments can also be used. For example, the above embodiments are described in the context of a video player, but the player could be an audio player, an animation player or any other content player. Some of the above embodiments splice advertizing into the video stream, but other embodiments could present the advertizing as an overlay-banner or other banner ad. Some embodiments could overwrite the audio or video portion, in whole or in part.

Above embodiments control ad modules at the granularity of content object. Ad functionality could be added to groups of content objects, for example, by playlist, customer, playback resolution, subject matter, site where embed code was loaded from, etc. We disclose above the use of modules that are loaded after the video is selected with an embedded player. Beyond ads and analytics, other functionality can be added with modules as dictated by the embed code parameters, which can change over time to support new functionality even if the embed code is already disseminated. Specifically, there could be modules that implement closed captioning, video editing and clipping, linking from the video to other web sites, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for interacting with a video player embedded into a web page to cause playing of a video, comprising:
   providing embed code that runs within a web browser;
   receiving an identifier from the embed code after the web browser loads the embed code;
   sending player code for implementing video player functionality after the web browser loads the embed code;
   sending parameters corresponding to the identifier to the web browser, wherein:
      the parameters identify the video that can be rendered by the video player,
      the parameters comprise first metadata associated with the video,
      the first metadata identifies one or more modules configured to add functionality to the video player,
      the identifier is indicative of a type of end-user device and a capability of the web browser,
      the identifier specifies a group of content objects,
      the group of content objects is one of slideshow, animation, video, and audio,
      the embed code is configured to display three content objects simultaneously using a primary tile and two secondary tiles, and
      the primary tile and the two secondary tiles include a video, a title, and a description;
   receiving a request for ad module code, where the ad module code to load ad request functionality into the web browser that integrates with the player code to provide the ad request functionality to the video player, wherein:
      the request for the ad module code is received after an end user requests playback of the video from the video player functionality, and
      the ad module code is written in a runtime programming language; and
   sending the ad module code to the web browser, wherein the ad module code:
      requests an ad,
      receives a determination of the ad from a plurality of ads, wherein the ad is chosen and tracked based on two or more different second metadata including: genre, playback time, placement of the ad, channel, zone, subject matter, aspect ratio, video quality, and the end-user device,
      receives a response specifying where the ad can be retrieved, and
      weaves the ad into the playback of the video, wherein the ad is spliced into the video via the ad module code on the end-user device.

2. The method for interacting with the video player embedded into the web page to cause playing of the video as recited in claim 1, wherein:
   a first server performs the step of sending the ad module code to the web browser,
   the requesting the ad by the ad module code is requested from a second server, and
   the first server and the second server are different.

3. A non-transitory machine-readable medium having machine-executable instructions configured to perform the machine-implementable method for interacting with the video player embedded into the web page to cause playing of the video of claim 1.

4. The method for interacting with the video player embedded into the web page to cause playing of the video as recited in claim 1, wherein the first metadata and the second metadata are different from each other.

5. A method for operating a video player embedded into a web page to play a video, comprising:
   loading embed code that runs within a web browser;
   sending an identifier from the embed code after the web browser loads the embed code;
   receiving player code for implementing video player functionality after the web browser loads the embed code;
   receiving parameters corresponding to the identifier with the web browser, wherein:
      the parameters identify the video that can be rendered by the video player,
      the parameters comprise first metadata associated with the video,
      the first metadata identifies one or more modules configured to add functionality to the video player,
      the identifier is indicative of a type of end-user device and a capability of the web browser,
      the identifier specifies a group of content objects,
      the group of content objects is one of slideshow, animation, video, and audio,
      the embed code is configured to display three content objects simultaneously using a primary tile and two secondary tiles, and
      the primary tile and the two secondary tiles include a video, a title, and a description;
   sending a request for ad module code to load ad request functionality into the web browser that integrates with the player code to provide the ad request functionality to the video player, wherein:
      the request for the ad module code is received after an end user requests playback of the video from the video player functionality, and
      the ad module code is written in a runtime programming language; and receiving the ad module code at the web browser, wherein the ad module code:
  requests an ad,
  receives a determination of the ad from a plurality of ads, wherein the ad is chosen and tracked based on two or more different second metadata including: genre, playback time, placement of the ad, channel, zone, subject matter, aspect ratio, video quality, and the end-user device,
  receives a response specifying where the ad can be retrieved, and
  weaves the ad into the playback of the video, wherein the ad is spliced into the video via the ad module code on the end-user device.

6. The method for operating the video player embedded into the web page to play the video as recited in claim 5, further comprising:
  playing the video with the video player; and
  presenting an ad formulated by the ad module code querying for the ad.

7. A non-transitory machine-readable medium having machine-executable instructions configured to perform the machine-implementable method for operating the video player embedded into the web page to play the video of claim 5.

8. The method for operating the video player embedded into the web page to play the video as recited in claim 5, further comprising:
  receiving the request for the ad from the ad module code, and
  sending the ad to the ad module code.

9. A computing device for operating a video player embedded into a web page to play a video, the computing device comprising:
  a processor configured to:
  load embed code that runs within a web browser;
  send an identifier from the embed code after the web browser loads the embed code;
  receive player code for implementing video player functionality after the web browser loads the embed code;
  receiving parameters corresponding to the identifier with the web browser, wherein:
    the parameters identify the video that can be rendered by the video player,
    the parameters comprise first metadata associated with the video,
    the first metadata identifies one or more modules configured to add functionality to the video player,
    the identifier is indicative of a type of end-user device and a capability of the web browser,
    the identifier specifies a group of content objects,
    the group of content objects is one of slideshow, animation, video, and audio, and
    the embed code is configured to display three content objects simultaneously using a primary tile and two secondary tiles,
    the primary tile and the two secondary tiles include a video, a title, and a description;
  send a request for ad module code to load ad request functionality into the web browser that integrates with the player code to provide the ad request functionality to the video player, wherein:
    the request for the ad module code is received after an end user requests playback of the video from the video player functionality, and
    the ad module code is written in a runtime programming language; and
  receive the ad module code with the web browser, wherein the ad module code:
    requests an ad,
    receives a determination of the ad from a plurality of ads, wherein the ad is chosen and tracked based on two or more different second metadata including: genre, playback time, placement of the ad, channel, zone, subject matter, aspect ratio, video quality, and the end-user device,
    receives a response specifying where the ad can be retrieved, and
    weaves the ad into the playback of the video, wherein the ad is spliced into the video via the ad module code on the end-user device; and
  a memory coupled to the processor.

10. The computing device for operating the video player embedded into the web page to play the video as recited in claim 9, wherein the processor is further configured to:
  use the ad module code to request an ad from an ad server located away from the computing device, and
  insert the ad into playback of the video.

* * * * *